(12) United States Patent
Zhang et al.

(10) Patent No.: US 11,275,931 B2
(45) Date of Patent: Mar. 15, 2022

(54) HUMAN POSE PREDICTION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Hong Zhang, Shenzhen (CN); Xiaoyong Shen, Shenzhen (CN); Jiaya Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1 day.

(21) Appl. No.: 16/903,534

(22) Filed: Jun. 17, 2020

(65) Prior Publication Data

US 2020/0311402 A1    Oct. 1, 2020

Related U.S. Application Data

(63) Continuation of application No. PCT/CN2019/077576, filed on Mar. 9, 2019.

(30) Foreign Application Priority Data

Apr. 11, 2018   (CN) .......................... 201810321191.X

(51) Int. Cl.
*G06K 9/00* (2006.01)
*G06K 9/46* (2006.01)
*G06K 9/62* (2022.01)
*G06N 3/02* (2006.01)

(52) U.S. Cl.
CPC .......... *G06K 9/00369* (2013.01); *G06K 9/46* (2013.01); *G06K 9/6256* (2013.01); *G06N 3/02* (2013.01)

(58) Field of Classification Search
None
See application file for complete search history.

(56) References Cited

U.S. PATENT DOCUMENTS

2004/0151366 A1    8/2004   Nefian et al.
2016/0063708 A1    3/2016   Okuyan et al.
(Continued)

FOREIGN PATENT DOCUMENTS

CN    103135765 A    6/2013
CN    104715493 A    6/2015
(Continued)

OTHER PUBLICATIONS

The World Intellectual Property Organization (WIPO) International Search Report for PCT/CN2019/077576 dated May 21, 2019 5 Pages (including translation).
(Continued)

*Primary Examiner* — Leon Flores
(74) *Attorney, Agent, or Firm* — Anova Law Group, PLLC

(57) ABSTRACT

A human pose prediction method is provided for an electronic device. The method includes using a basic neural network based on image-feature-based prediction to perform prediction on an inputted target image, to obtain an initial prediction map of a human key-point; inputting the initial prediction map of the human key-point and a human structure diagram into a pose graph neural network based on spatial information mining, each node in the human structure diagram corresponding to a human joint respectively, and each edge connecting adjacent human joints; using the pose graph neural network to initialize the human structure diagram by using the initial prediction map of the human key-point, to obtain an initialized human structure diagram; and using the pose graph neural network to perform iterative prediction on the initialized human structure diagram, to obtain a final prediction map, the final prediction map indicating a predicted human pose.

15 Claims, 8 Drawing Sheets

(56) References Cited

U.S. PATENT DOCUMENTS

2017/0154212 A1    6/2017  Feris et al.
2019/0172223 A1*  6/2019  Vajda .................. G06K 9/4633

FOREIGN PATENT DOCUMENTS

CN        106845398 A    6/2017
CN        107808111 A    3/2018
CN        108549863 A    9/2018

OTHER PUBLICATIONS

The State Intellectual Property Office of the People's Republic of China (SIPO) Office Action 1 for 201810321191.X dated Jul. 24, 2019 10 Pages (including translation).

Xianjie Chen et al., "Articulated Pose Estimation by a Graphical Model with Image Dependent Pairwise Relations," OALib Journal, Nov. 4, 2014 (Nov. 4, 2014), ISSN: 2333-9721, pp. 1-8. 9 Pages.

Guijin Han, "Human pose estimation based on improved CNN and weighted SVDD algorithm," Computer Engineering and Applcations, vol. 54, No. 24, Mar. 13, 2018 (Mar. 13, 2018), pp. 198-203. 6 Pages.

The European Patent Office (EPO) The Extended European Search Report for 19784481. dated Dec. 4, 20, 2021 26 Pages.

Xe Sun Ei Al., "Human Pose Estimation using Global and Local Normalization," ARXIV.ORG, arXiv:1709.07220v1, Sep. 21, 2017. 3 pages.

* cited by examiner

HUMAN POSE PREDICTION METHOD AND APPARATUS, DEVICE, AND STORAGE MEDIUM

RELATED APPLICATIONS

This application is a continuation application of PCT Patent Application No. PCT/CN2019/077576, filed on Mar. 9, 2019, which claims priority to Chinese Patent Application No. 201810321191.X, entitled "HUMAN POSE PREDICTION METHOD AND APPARATUS, DEVICE, AND STORAGE MEDIUM" filed with the China National Intellectual Property Administration on Apr. 11, 2018, which is incorporated herein by reference in its entirety.

FIELD OF THE TECHNOLOGY

This application relate to the field of machine learning and, in particular, to a human pose prediction method and apparatus, a device, and a storage medium.

BACKGROUND

The objective of human pose estimation is to precisely predict human key points at a pixel level, for example, identify positions of key points such as a head, an elbow, a hand, a knee, and a foot in an image. Human pose estimation can further serve many more complex tasks, such as human behavior estimation, target tracking, and human interaction.

A prediction method based on image features is provided in the related art. The objective of the method based on image features is to learn an image feature expression with high quality, and then directly regress the image feature expression to a corresponding key point position.

However, the prediction method based on image features often only focuses on mining image features, and the prediction precision is limited. The disclosed methods and systems are directed to solve one or more problems set forth above and other problems.

SUMMARY

Embodiments of the present disclosure provide a human pose prediction method and apparatus, a device, and a storage medium, to resolve the problem that the prediction method based on image features only focuses on mining image features and has limited prediction precision.

According to one aspect of the present disclosure, a human pose prediction method is provided for an electronic device. The method includes using a basic neural network based on image-feature-based prediction to perform prediction on an inputted target image, to obtain an initial prediction map of a human key-point; inputting the initial prediction map of the human key-point and a human structure diagram into a pose graph neural network based on spatial information mining, each node in the human structure diagram corresponding to a human joint respectively, and each edge connecting adjacent human joints; using the pose graph neural network to initialize the human structure diagram by using the initial prediction map of the human key-point, to obtain an initialized human structure diagram; and using the pose graph neural network to perform iterative prediction on the initialized human structure diagram, to obtain a final prediction map, the final prediction map indicating a predicted human pose.

According to another aspect of the present disclosure, an electronic device for human pose prediction is provided. The electronic device includes a memory storing computer program instructions; and a processor coupled to the memory. When executing the computer program instructions, the processor is configured to perform: using a basic neural network based on image-feature-based prediction to perform prediction on an inputted target image, to obtain an initial prediction map of a human key-point; inputting the initial prediction map of the human key-point and a human structure diagram into a pose graph neural network based on spatial information mining, each node in the human structure diagram corresponding to a human joint respectively, and each edge connecting adjacent human joints; using the pose graph neural network to initialize the human structure diagram by using the initial prediction map of the human key-point, to obtain an initialized human structure diagram; and using the pose graph neural network to perform iterative prediction on the initialized human structure diagram, to obtain a final prediction map, the final prediction map indicating a predicted human pose.

According to another aspect of the present disclosure, a non-transitory computer-readable storage medium is provided. The non-transitory computer-readable storage medium stores computer program instructions executable by at least one processor to perform: using a basic neural network based on image-feature-based prediction to perform prediction on an inputted target image, to obtain an initial prediction map of a human key-point; inputting the initial prediction map of the human key-point and a human structure diagram into a pose graph neural network based on spatial information mining, each node in the human structure diagram corresponding to a human joint respectively, and each edge connecting adjacent human joints; using the pose graph neural network to initialize the human structure diagram by using the initial prediction map of the human key-point, to obtain an initialized human structure diagram; and using the pose graph neural network to perform iterative prediction on the initialized human structure diagram, to obtain a final prediction map, the final prediction map indicating a predicted human pose.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly introduces the accompanying drawings for describing the embodiments. Apparently, the accompanying drawings in the following description show only some embodiments of the present disclosure, and a person of ordinary skill in the art may derive other drawings from these accompanying drawings without creative efforts.

DETAILED DESCRIPTION

To make the objectives, technical solutions, and advantages of the present disclosure clearer, the following further describes implementations of the present disclosure in detail with reference to the accompanying drawings.

An embodiment of the present disclosure provides a human pose prediction method. The human pose prediction method can predict pixel-level human key-points in a target image, the human key-points generally including human joints. The human key-point includes but is not limited to at least one of a head, a neck, a shoulder, an elbow, a wrist, a waist, a hip, a crotch joint, a knee, and an ankle.

The human pose prediction method can further serve many more complex tasks, such as human behavior estimation, moving target tracking, and man-machine interaction. Typically, the human pose prediction method can be applied to the following application scenarios:

Surveillance Field

After a surveillance camera captures a surveillance image, a backend device predicts a human pose in the surveillance image, to implement moving target tracking. Optionally, the backend device can further estimate a human behavior according to the predicted human pose. For example, when an estimated human pose is a falling over, the backend device transmits an alarm to an operator on duty. Alternatively, when an estimated human pose is a stealing behavior, the backend server transmits an alarm to the police.

Man-Machine Interaction

Using an intelligent robot as an example, the intelligent robot is provided with a camera and a processing chip. The camera can capture a regional image of a region in front of the intelligent robot. The processing chip can identify a human pose in the regional image, and control the intelligent robot to make a preset response when the identified human pose is a preset pose. For example, when the identified human pose is a waving pose, the intelligent robot is controlled to make a greeting action.

Unmanned Driving

A driverless car is provided with a camera and a processing chip. The camera can capture a front image during driving of the driverless car. The processing chip can identify a human pose in the front image. When the human pose in the front image is falling over, the driverless car is controlled to slowing down or braking.

Figure 1:
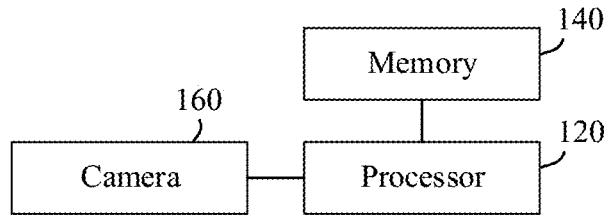
FIG. 1 illustrates a structural block diagram of an image processing device according to an exemplary embodiment of the present disclosure.

FIG. 1 is a structural block diagram of an image processing device according to an exemplary embodiment of the present disclosure. The image processing device may be implemented as a component on a surveillance system, an intelligent robot or a driverless car. The image processing device may be referred to as a device or an electronic device for short. The image processing device includes: a processor 120, a memory 140, and a camera 160.

The processor 120 includes one or more processing cores, for example, a 4-core processor or an 8-core processor. The processor 120 is configured to execute at least one of an instruction, code, a code snippet, and a program stored in the memory 140.

The processor 120 is electrically connected to the memory 140. Optionally, the processor 120 is connected to the memory 140 by using a bus. The memory 140 stores one or more instructions, code, code snippets, and/or programs. When executed by the processor 120, the instruction, the code, the code snippet, and/or the program are/is used to implement the human pose prediction method provided in the followings.

The processor 120 is further electrically connected to the camera 160. Optionally, the processor 120 is connected to the camera 160 by using a bus. The camera 160 is a sensing device having an image capture capability. The camera 160 may also be referred to as another name such as a camera lens or an optical sensing device. The camera 160 has a capability of continuously collecting images or collecting images for multiple times. Optionally, the camera 160 is disposed inside the device or outside the device. In some embodiments, if the target image is an image captured by another device, the camera 160 is an optional component.

A person skilled in the art may understand that the structure shown in FIG. 1 does not constitute any limitation to the image processing device, and the device may include more components or fewer components than those shown in the figure, or some components may be combined, or a different component may be used.

Figure 2:
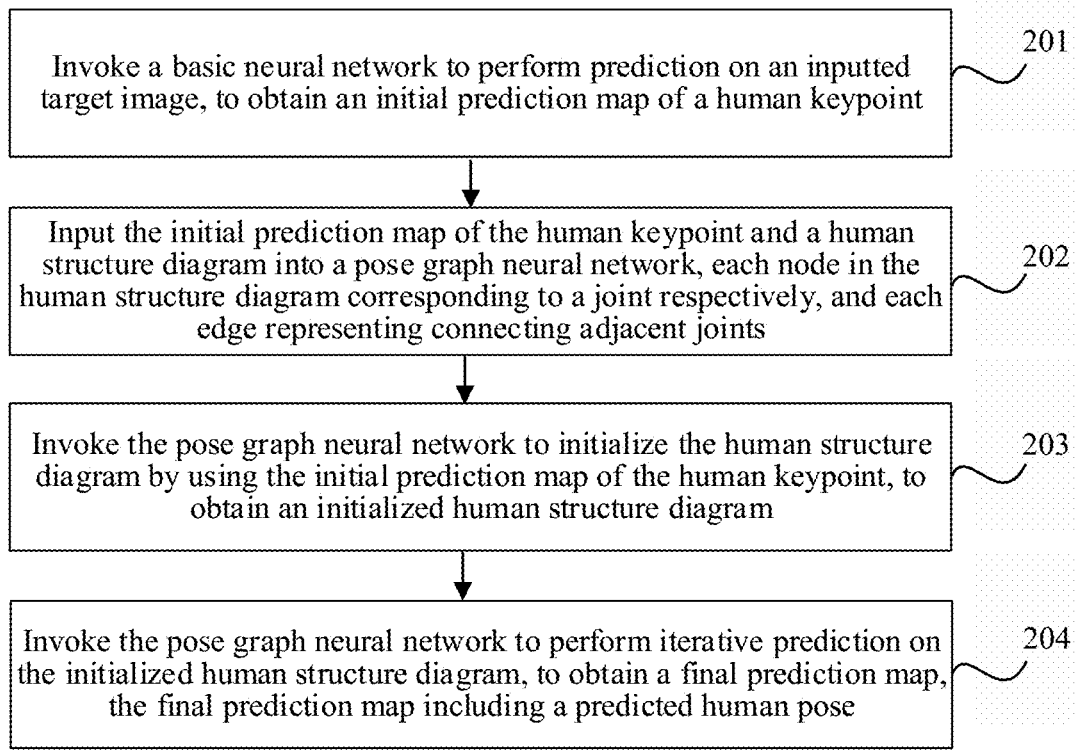
FIG. 2 illustrates a method flowchart of a human pose prediction method according to an exemplary embodiment of the present disclosure.

FIG. 2 is a flowchart of a human pose prediction method according to an exemplary embodiment of the present disclosure. As an example, the method is applied to the image processing device (referred to as a device for short in the following) shown in FIG. 1. The method may include the followings.

Step 201: Invoke a basic neural network to perform prediction on an inputted target image, to obtain an initial prediction map of a human key-point.

Figure 3:
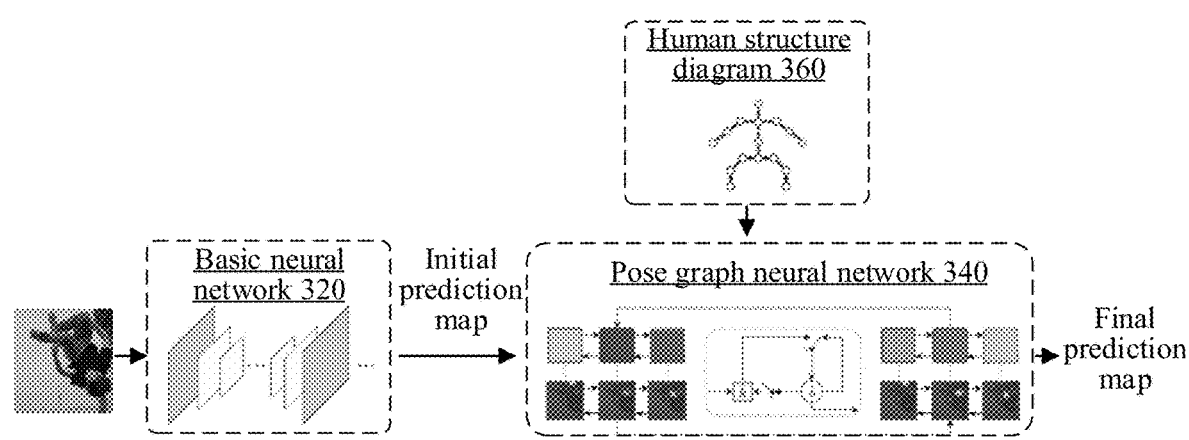
FIG. 3 illustrates a schematic diagram of a neural network architecture according to an exemplary embodiment of the present disclosure.

The neural network architecture in one embodiment uses "basic neural network 320"+"pose graph neural network 340" to implement human pose prediction, as shown in FIG. 3. The basic neural network 320 is configured to predict a human key-point in a target image by using image-feature-based prediction, to obtain an initial prediction map. The pose graph neural network 340 is configured to mine spatial information between human key-points in the target image by using a human structure diagram 360, and optimize the initial prediction map to obtain a final prediction map.

The target image is an image that requires human pose prediction. The target image may be captured by the device itself, or may be captured by another device and then transmitted to the device. The target image may be one frame of image, or may be one frame in a plurality of image frames in a video frame sequence, and this is not limited in the present disclosure.

The human key-point is a representative key-point for a human pose, and the key-point may be a pixel-level point. Generally, the human key-point includes a point corresponding to a human joint, which includes but is not limited to at least one of a head, a neck, a shoulder, an elbow, a wrist, a hip, a crotch, a knee, and an ankle. In one embodiment of the present disclosure, the human key-points including a head, a neck, shoulders, elbows, wrists, a waist, a hip, crotch joints, knees, and ankles is used as an example for description.

Optionally, there may be a plurality of initial prediction maps, and each human key-point corresponds to a respective initial prediction map. In the initial prediction map, a position of the human key-point is highlighted. For example, the basic neural network outputs a first initial prediction map corresponding to a head, a second initial prediction map corresponding to a neck, a third initial prediction map corresponding to a left shoulder, a fourth initial prediction map corresponding to a right shoulder, a fifth initial prediction map corresponding to a left elbow, a sixth initial prediction map corresponding to a right elbow, a seventh initial prediction map corresponding to a left wrist, an eighth initial prediction map corresponding to a right wrist, a ninth initial prediction map corresponding to a waist, a tenth initial prediction map corresponding to a hip, an eleventh initial prediction map corresponding to a left crotch joint, a twelfth initial prediction map corresponding to a right crotch joint, a thirteenth initial prediction map corresponding to a left knee, a fourteenth initial prediction map corresponding to a right knee, a fifteenth initial prediction map corresponding to a left ankle, and a sixth initial prediction map corresponding to a right ankle. A bright spot is used for marking the human key-point in each initial prediction map.

Step 202: Input the initial prediction map of the human key-point and a human structure diagram into a pose graph neural network, each node in the human structure diagram corresponding to a human joint respectively, and each edge representing connecting adjacent human joints.

The human structure diagram is a tree undirected graph for representing a human structure. Optionally, the human structure diagram includes k nodes, k being a positive integer. Each node corresponds to a human joint respectively, and each edge represents connecting adjacent human joints.

The human structure diagram and the initial prediction map of each human key-point are inputted into the pose graph neural network for prediction. Optionally, the pose graph neural network is a recursive neural network. The pose graph neural network may alternatively be a tree-structured recursive neural network, and the recursive neural network is capable of processing recursive structure data of a tree or a graph.

Step 203: Invoke the pose graph neural network to initialize the human structure diagram by using the initial prediction map of the human key-point, to obtain an initialized human structure diagram.

The pose graph neural network is configured to mine spatial information between human key-points in the target image by using the human structure diagram. Optionally, assuming that the human structure diagram includes k nodes, the pose graph neural network initializes the human structure diagram by using initial prediction maps of k human key-points, to obtain an initialized human structure frame.

Step 204: Invoke the pose graph neural network to perform iterative prediction on the initialized human structure diagram, to obtain a final prediction map, the final prediction map including a predicted human pose.

The pose graph neural network performs T times of iterative prediction on the initialized human structure diagram, and mines spatial information between human key-points in the target image in the iteration process, thereby correcting the human key-points in the initial prediction maps, to obtain a final prediction map, where T is an integer greater than 2. The final prediction map includes a predicted human pose. The final prediction map may be a superposition result of the output of the pose graph neural network and the initial prediction maps.

Thus, according to the method provided in one embodiment, a target image is inputted into a basic neural network to obtain an initial prediction map of a human joint, a human structure diagram is initialized by using the initial prediction map of the human joint, and iterative prediction is performed on an initialized human structure diagram by using a pose graph neural network, to obtain a final prediction map. Hidden information between human joints can be mined by fully utilizing the pose graph neural network, thereby obtaining accurate human pose information by combining extraction of image features with mining of spatial information between human joints. The method provided in the present disclosure achieves high level performance in terms of two standard open datasets (MPII and LSP) related to human pose estimation.

Based on FIG. 2, one embodiment of the present disclosure proposes a neural network architecture of "cascade prediction fusion (CPF)"+"Pose Graph Neural Network (PGNN)". That is, prediction is performed in the basic network in FIG. 3 by using CPF. Because the basic neural network includes a plurality of prediction stages (Stark), which is different from the related art in which an output of a previous stage is directly used as an input of a next stage, CPF can directly transfer a prediction result of a previous stage to a next stage, thereby avoiding impact of multiple times of convolution and pooling on information.

Figure 4:
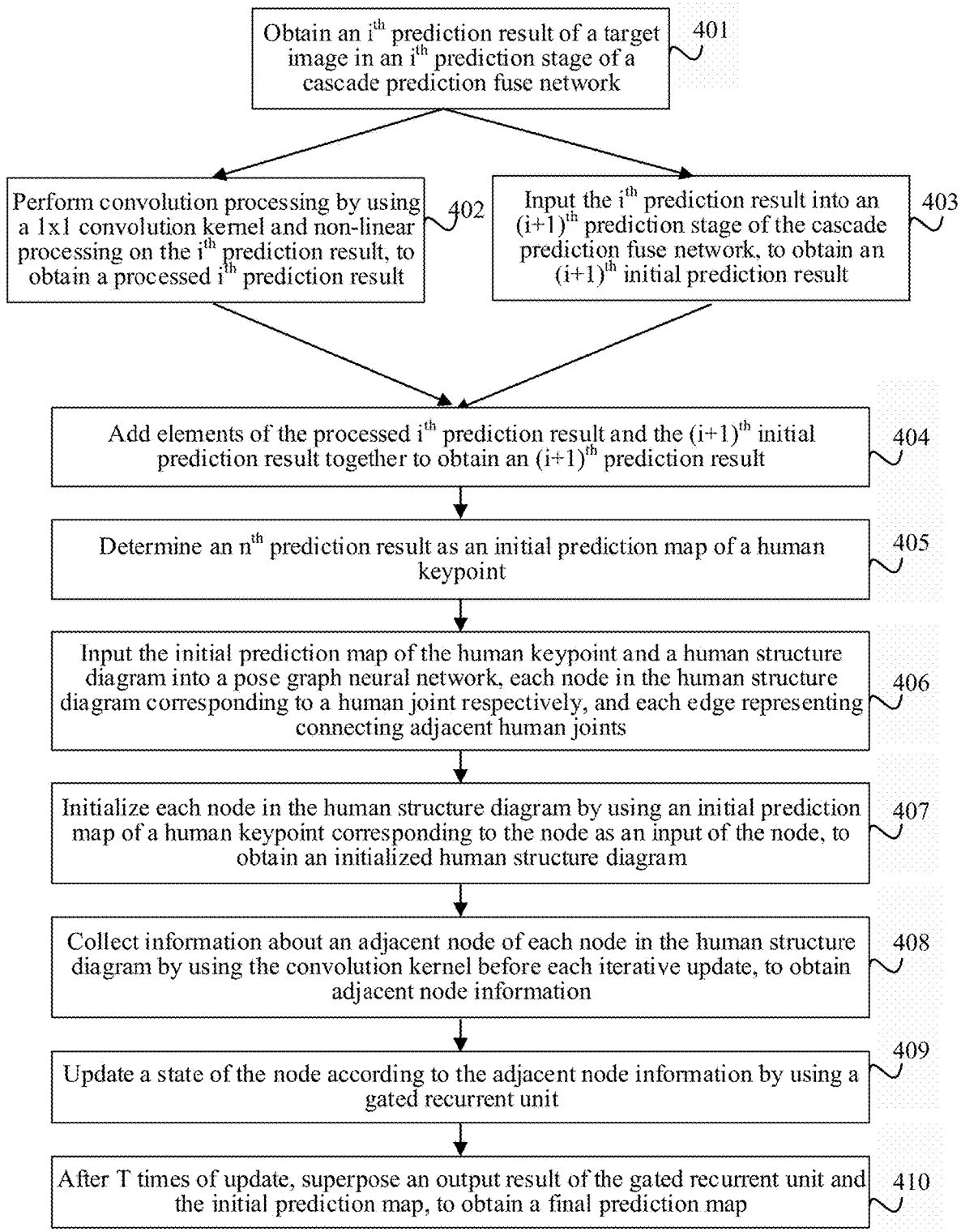
FIG. 4 illustrates a method flowchart of a human pose prediction method according to another exemplary embodiment of the present disclosure.

FIG. 4 is a flowchart of a human pose prediction method according to an exemplary embodiment of the present disclosure. As an example, the method is applied to the device shown in FIG. 1. The method includes the followings.

Step 401: Obtain an $i^{th}$ prediction result of a target image in an $i^{th}$ prediction stage of a cascade prediction fuse network.

The target image is an image that requires human pose prediction. The target image may be captured by the device itself, or may be captured by another device and then transmitted to the device. The target image may be one frame of image, or may be one frame in a plurality of image frames in a video frame sequence, and this is not limited in the present disclosure.

A basic neural network in one embodiment uses CPF. The basic neural network includes a plurality of prediction stages. For each prediction stage $S_i$, channels of a prediction result of an $i^{th}$ prediction stage are lifted to have the same size as a prediction feature map of an $(i+1)^{th}$ prediction stage by using a 1*1 convolution kernel. Then, the prediction result of the $i^{th}$ prediction stage and a prediction result of the $(i+1)^{th}$ prediction stage are added together to serve as an input of an $(i+2)^{th}$ prediction result, so that a prediction result of a previous prediction stage can be directly transferred to a next prediction stage, thereby implementing cumulative fusion of prediction information.

Figure 5:
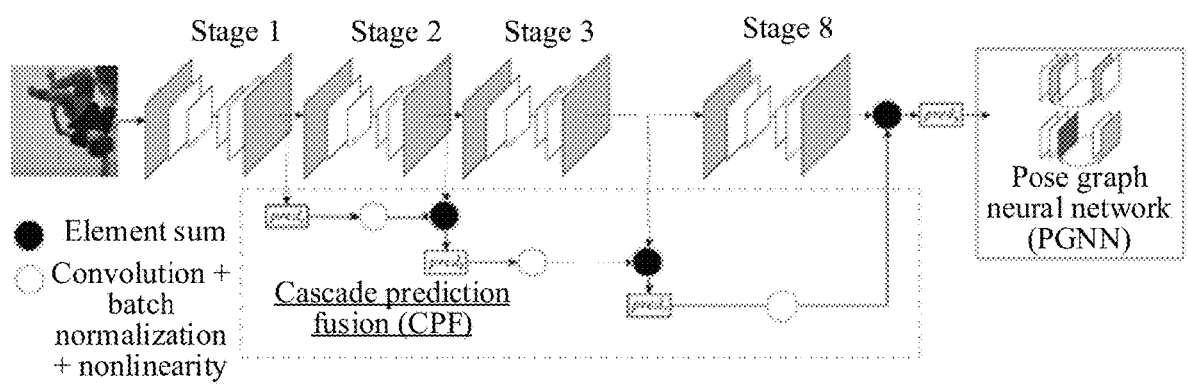
FIG. 5 illustrates a schematic diagram of a cascade prediction fuse network according to another exemplary embodiment of the present disclosure.

Referring to FIG. 5, the basic neural network including 8 prediction stages is used as an example. The target image is used as an input of the basic neural network, and is first inputted into the first prediction stage of the basic neural network. The first prediction stage includes at least one convolutional layer, and the convolutional layer is used for performing convolution and pooling on the target image, thereby performing prediction on a human key-point.

Step 402: Perform convolution processing by using a 1×1 convolution kernel and non-linear processing on the $i^{th}$ prediction result, to obtain a processed $i^{th}$ prediction result.

The 1×1 convolution kernel is used for lifting the quantity of channels of the $i^{th}$ prediction result to have the same size as the $(i+1)^{th}$ prediction result, thereby implementing cross-channel information interaction. Optionally, the process in which the device processes the $i^{th}$ prediction result by using the 1×1 convolution kernel includes the following sub-steps:

Sub-step 1: Perform convolution processing on the $i^{th}$ prediction result by using a 1×1 convolution kernel, to obtain a convolution result.

Sub-step 2: Perform batch normalization on the convolution result to obtain a normalized result.

Batch normalization (BN) is developed to overcome difficulty in training caused by an increase in the depth of the neural network. As the depth of the neural network increases, training becomes increasingly difficult, and a convergence speed becomes slow. This usually causes a vanishing gradient problem. BN is generally used before nonlinear processing to normalize a convolution result, so that all dimensions of an output signal have an average value of 0 and a variance of 1. Therefore, an input of each layer has a stable distribution, which facilitates training of the neural network. BN is an optional step.

Sub-step 3: Perform nonlinear processing on the normalized result, to obtain the processed $i^{th}$ prediction result.

Nonlinear processing (e.g., using Rectified Linear Units, ReLU) is a pixel-level nonlinear operation, and is used for introducing nonlinearity to a convolution result and setting all pixel values less than 0 in a prediction result to 0.

Referring to FIG. 5, after the first prediction result $pred_1$ is obtained in the first prediction stage, 1*1 convolution processing, batch normalization, and nonlinear processing are performed on the first prediction result $pred_1$ to obtain a processed first prediction result $pred_1$.

Step 403: Input the $i^{th}$ prediction result into an $(i+1)^{th}$ prediction stage of the cascade prediction fuse network, to obtain an $(i+1)^{th}$ initial prediction result.

Step 404: Add elements of the processed $i^{th}$ prediction result and the $(i+1)^{th}$ initial prediction result together to obtain an $(i+1)^{th}$ prediction result.

Referring to FIG. 5, the first prediction result $pred_1$ is inputted to the second prediction stage (including at least one convolutional layer), to obtain the second initial prediction result. Then, elements of the processed first initial prediction result and the second initial prediction result are added together (Elem-wise Sum), to obtain the second prediction result $pred_2$.

Step 405: Repeat the foregoing process, and determine an $n^{th}$ prediction result as an initial prediction map of a human key-point until i+1 is equal to n.

Referring to FIG. 5, the device performs 1*1 convolution, batch normalization and nonlinear processing on the second prediction result $pred_2$, to obtain a processed second prediction result, and at the same time, inputs the second prediction result $pred_2$ into the third prediction stage (including at least one convolutional layer), to obtain the third initial prediction result. Then, the device adds the processed second prediction result and the third initial prediction result together, to obtain the third prediction result $pred_3$. The device performs 1*1 convolution, batch normalization and nonlinear processing on the third prediction result $pred_3$, to obtain a processed third prediction result, and at the same time, inputs the third prediction result $pred_3$ into the fourth prediction stage (including at least one convolutional layer), to obtain the fourth initial prediction result. Then, the device adds the processed third prediction result and the fourth initial prediction result together, to obtain the fourth prediction result $pred_4$. Similarly, 1*1 convolution, batch normalization and nonlinear processing are performed on the seventh prediction result $pred_7$, to obtain a processed seventh prediction result, and at the same time, the seventh prediction result $pred_7$ is inputted into the eighth prediction stage (including at least one convolutional layer), to obtain the eighth initial prediction result. Then, the processed seventh prediction result and the eighth initial prediction result are added together, to obtain the eighth prediction result $pred_8$.

The eighth prediction result is used as the initial prediction map of the human key-point outputted by the basic neural network. Optionally, because there may be a plurality of (for example, 16) human key-points, there may also be 16 initial prediction maps.

Step 406: Input the initial prediction map of the human key-point and a human structure diagram into a pose graph neural network, each node in the human structure diagram corresponding to a human joint respectively, and each edge representing connecting adjacent human joints.

The human structure diagram is a tree undirected graph for representing a human structure. Optionally, the human structure diagram includes k nodes, k being a positive integer. Each node corresponds to a human joint respectively, and each edge represents connecting adjacent human joints. The human structure diagram is a tree undirected graph established according to a human structure, and different human structure diagrams may be used in different embodiments.

Figure 6:
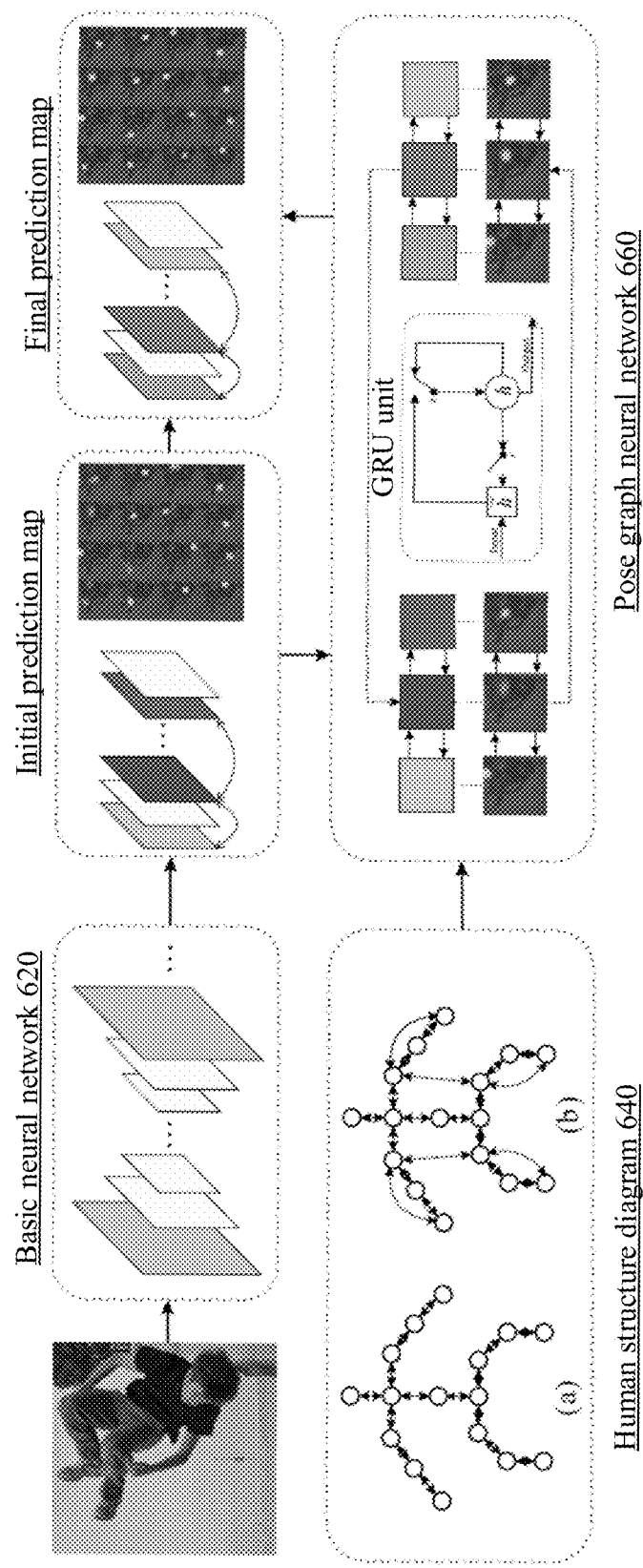
FIG. 6 illustrates a schematic diagram of a pose graph neural network according to another exemplary embodiment of the present disclosure.

In an embodiment, referring to structure (a) in FIG. 6, the human structure diagram may include 16 nodes. A node representing a head is connected to a node representing a neck, the node representing the neck is connected to a node representing a shoulder, the node representing the shoulder is connected to a node representing an elbow, the node representing the elbow is connected to a node representing a wrist, the node representing the neck is further connected to a node representing a waist, the node representing the waist is connected to a node representing a hip, the node representing the hip is further connected to a node representing a crotch, the node representing the crotch is further connected to a node representing a knee, and the node representing the knee is further connected to a node representing an ankle.

In another embodiment, referring to structure (b) in FIG. 6, considering that human joints on the same side are also linked during movement, in the human structure diagram, a node representing a left wrist may further be connected to a node representing a left shoulder, the node representing the left shoulder may further be connected to a node representing a left crotch, and the node representing the left crotch may further be connected to a node representing a left ankle; in the human structure diagram, a node representing a right wrist may further be connected to a node representing a right shoulder, the node representing the right shoulder may further be connected to a node representing a right crotch, and the node representing the right crotch may further be connected to a node representing a right ankle.

The device may use any human structure diagram shown in (a) in FIG. 6 or shown in (b) in FIG. 6, and this is not limited in one embodiment.

After predicting the initial prediction maps of the human key-points, the basic neural network 620 inputs the human structure diagram 640 and the initial prediction map of each human key-point into the pose graph neural network 660 for prediction. Optionally, the pose graph neural network (PGNN for short) is a recursive neural network. Optionally, the pose graph neural network includes a gated recurrent unit (GRU), and the GRU includes a plurality of convolution kernels.

Step 407: Initialize each node in the human structure diagram by using an initial prediction map of a human key-point corresponding to the node as an input of the node, to obtain an initialized human structure diagram.

For each node in the human structure diagram 640, the pose graph neural network 660 initializes the node by using an initial prediction map of a human key-point corresponding to the node as an input of the node. For example, initialization is performed by using an initial prediction map of the head as an input corresponding to the head node, and initialization is performed by using an initial prediction map corresponding to a neck as an input corresponding to the neck node, to obtain an initialized human structure diagram.

Optionally, a state of each node in the human structure diagram 640 is initialized by using the following method:

$$h_k^0 = \mathcal{F}_k(\Theta, I), k \in \{1 \ldots K\},$$

$h_k$ represents a $k^{th}$ node in a human structure diagram, and K represents the quantity of nodes in the human structure diagram 640, for example 16. F represents a basic neural network, θ represents a weight parameter set in the neural network, and I is an original input image.

Step 408: Collect information about an adjacent node of each node in the human structure diagram by using the convolution kernel before each iterative update, to obtain adjacent node information.

The human structure diagram 640 is used for mining spatial information between human joints in the target image. Before iterative prediction is performed on the human structure diagram 640 by using the GRU, information about an adjacent node of each node in the human structure diagram 640 needs to be collected. That is, before starting updating the state for the $t^{th}$ time, the GRU first collects a state updated in the $(t-1)^{th}$ time from the adjacent node, where t is a positive integer greater than 1. Optionally, information is transferred between adjacent nodes by using a convolution kernel. Adjacent node information collected for each node is shown in the following formula:

$$x_k^t = \sum_{k,k' \in \Omega} W_{p,k} h_{k'}^{t-1} + b_{p,k},$$

k is a $k^{th}$ node, k' is an adjacent node of the $k^{th}$ node, $W_{p,k}$ is a weight parameter in a neural network, $b_{p,k}$ is an offset of the $k^{th}$ node, and Ω is a set of connected edges. $h_k^{t-1}$ represents a state of the $k^{th}$ node in a $(t-1)^{th}$ update.

Step 409: Update a state of the node according to the adjacent node information by using a gated recurrent unit.

After the information of each node is collected, the state of each node is updated according to the adjacent node information by using the GRU. The GRU includes an update gate and a reset gate. The update process may be represented by using the following formula:

$$z_k^t = \sigma(W_{z,k} x_k^t + U_{z,k} h_k^{t-1} + b_{z,k}),$$

$$r_k^t = \sigma(W_{r,k} x_k^t + U_{r,k} h_k^{t-1} + b_{r,k}),$$

$$\tilde{h}_k^t = \tan h(W_{h,k} x_k^t + U_{h,k}(r_k^t \odot h_k^{t-1}) + b_{h,k}),$$

$$h_k^t = (1 - z_k^t) \odot h_k^{t-1} + z_k^t \odot \tilde{h}_k^t.$$

where z represents an update gate, r represents a reset gate, $W_{z,k}$ and $U_{z,k}$ are weight parameters in a GRU, $b_{z,k}$ is an offset of a $k^{th}$ node in the GRU, $h_k^t$ represents a state of the $k^{th}$ node in a $t^{th}$ update, and $\tilde{h}_k^t$ represents a candidate hidden state of the $k^{th}$ node in the $t^{th}$ update. The hyperbolic tangent function tan h is an activation function.

Step 410: After T times of update, superpose an output result of the gated recurrent unit and the initial prediction map, to obtain a final prediction map.

After T times of update, the GRU optimizes the initial prediction map, to obtain a more accurate final prediction map. Optionally, a final output of the entire neural network is a final prediction map added with the target image.

Thus, according to the method provided in one embodiment, a target image is inputted into a basic neural network to obtain an initial prediction map of a human joint, a human structure diagram is initialized by using the initial prediction map of the human joint, and iterative prediction is performed on an initialized human structure diagram by using a pose graph neural network, to obtain a final prediction map. Hidden information between human joints can be mined by fully utilizing the pose graph neural network, thereby obtaining accurate human pose information by combining extraction of image features with mining of spatial information between human joints. The method provided in the present disclosure achieves high level performance in terms of two standard open datasets (MPII and LSP) related to human pose estimation.

Further, a prediction result of a previous stage is further fused with a prediction result of a next stage by using CPF as a basic neural network, and the prediction result of each stage is fully utilized, so that the basic neural network has higher accuracy when predicting human key-points based on image features.

Further, channels of the prediction result of the previous prediction stage are lifted to have the same size as the prediction result of the next prediction stage by using a 1*1 convolution kernel, thus implementing information transmission between different prediction stages. In addition, the 1*1 convolution kernel may be further used for filtering useless information or noise, thereby reserving information of interest for delivery.

Further, a vanishing gradient problem caused by excessive convolutional layers in the entire neural network is further resolved by using batch normalization.

Figure 7:
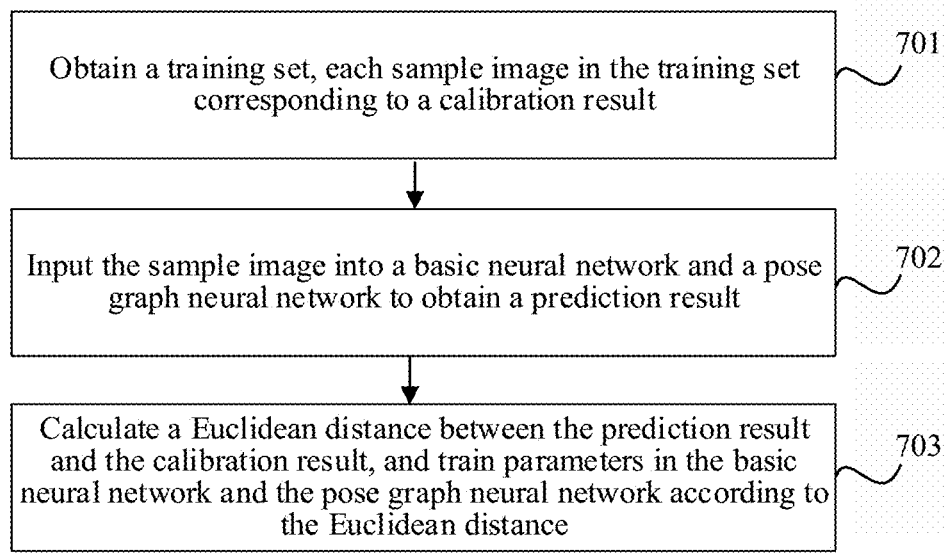
FIG. 7 illustrates a schematic diagram of some sub-steps of a human pose prediction method according to another exemplary embodiment of the present disclosure.

In an embodiment based on FIG. 2 or FIG. 5, because the entire neural network architecture is an end-to-end structure, end-to-end training can further be achieved. A training method of the foregoing neural network structure is the following method. The training method may be performed by the device shown in FIG. 1, or performed by another device having computing power, which is not limited. As shown in FIG. 7:

Step 701: Obtain a training set, each sample image in the training set corresponding to a calibration result.

The training set includes a plurality of sample images, and each sample image includes at least one character. Optionally, character poses in different sample images are different. Moreover, each sample image in the training set further corresponds to a calibration result, and the calibration result is a result obtained after character key-points in the sample image are calibrated.

Step 702: Input the sample image into a basic neural network and a pose graph neural network to obtain a prediction result.

After the sample image is inputted into the basic neural network and the pose graph neural network, a prediction result of the basic neural network and the pose graph neural network for the character pose in the sample image, that is, a final prediction map, can be obtained.

Step 703: Calculate a Euclidean distance between the prediction result and the calibration result, and train parameters in the basic neural network and the pose graph neural network according to the Euclidean distance.

Optionally, training is performed by using minimizing the following function as a training target:

$$L_2 = \frac{1}{K}\sum_{k=1}^{K}\sum_{x,y}\|\tilde{P}_k(x,y) - P_k(x,y)\|^2,$$

where (x, y) is a pixel position, k is a $k^{th}$ node, P(x, y) is a calibration result of a human key-point, and $\tilde{P}(x, y)$ is a prediction result of a pose graph neural network for the human keypoint. The Euclidean distance $L_2$ represents an error between the prediction result and the calibration result. Optionally, the basic neural network and the pose graph neural network are calculated by using a back propagation through time (BPTT) algorithm.

In the method provided in one embodiment, a Euclidean distance is further used as an error calculation formula during training, to calculate an error between a prediction result and a calibration result rapidly, thereby training and optimizing the entire neural network architecture quickly based on the BPTT algorithm.

Figure 8:
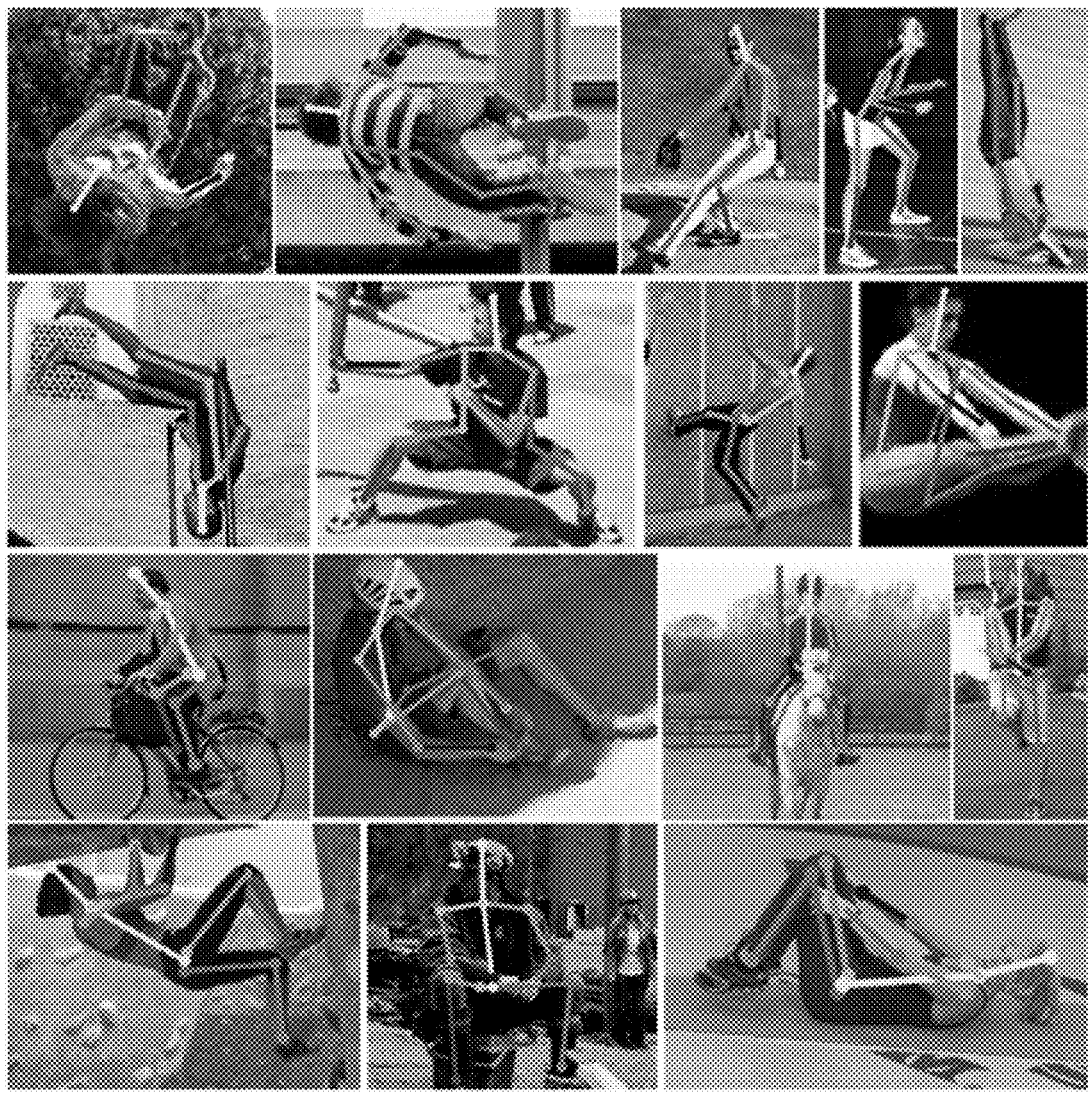
FIG. 8 illustrates an effect diagram of human poses predicted by a human pose prediction method according to an exemplary embodiment of the present disclosure.

FIG. 8 shows human pose images obtained after prediction is performed on some target graphs by using the technical solution provided in the present disclosure. The technical solution in the present disclosure can accurately predict human poses that are deformed greatly or shielded. Especially, in a motion scenario, the solution in the present disclosure can resolve large-scale shape changing desirably.

Figure 9:
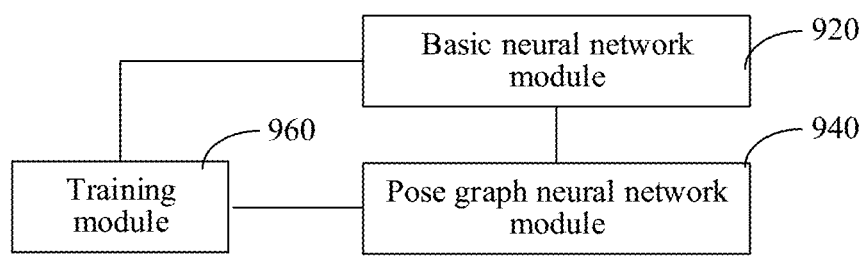
FIG. 9 illustrates a block diagram of a human pose prediction apparatus according to an exemplary embodiment of the present disclosure.

FIG. 9 is a structural block diagram of a human pose estimation apparatus according to an exemplary embodiment of the present disclosure. The human pose estimation apparatus may be implemented as all or a part of an image processing device by software, hardware, or a combination of software and hardware. The apparatus includes a basic neural network module 920 and a pose graph neural network module 940.

The basic neural network module 920 is configured to perform prediction on an inputted target image, to obtain an initial prediction map of a human keypoint.

The pose graph neural network module 940 is configured to obtain the initial prediction map of the human key-point and a human structure diagram, each node in the human structure diagram corresponding to a human joint respectively, and each edge connecting adjacent human joints.

The pose graph neural network module 940 is configured to initialize the human structure diagram by using the initial prediction map of the human key-point, to obtain an initialized human structure diagram.

The pose graph neural network module 940 is configured to perform iterative prediction on the initialized human structure diagram, to obtain a final prediction map, the final prediction map including a predicted human pose.

In an optional embodiment, the pose graph neural network module 940 is configured to initialize each node in the human structure diagram by using an initial prediction map of a human key-point corresponding to the node as an input of the node, to obtain the initialized human structure diagram.

The human key-point includes at least one of a head, a neck, an elbow, a wrist, a waist, a hip, a crotch, a knee, and an ankle.

In an embodiment, the pose graph neural network module 940 includes a convolution kernel and a gated recurrent unit.

The pose graph neural network module 940 is configured to collect information about an adjacent node of each node in the human structure diagram by using the convolution kernel before each iterative update, to obtain adjacent node information; and update a state of the node according to the adjacent node information by using the gated recurrent unit, the gated recurrent unit being used for mining spatial information between adjacent nodes in the human structure diagram; and obtain the final prediction map after T times of update.

In an embodiment, the basic neural network module 920 includes a cascade prediction fuse network, and the cascade prediction fuse network includes n prediction stages, n being a positive integer.

The operation of inputting the target image into the basic neural network to obtain the initial prediction map of the human key-point includes: the basic neural network module 920 being configured to obtain an $i^{th}$ prediction result of the target image in an $i^{th}$ prediction stage of the cascade prediction fuse network, i being a positive integer with an initial value of 1; perform convolution processing by using a 1×1 convolution kernel and non-linear processing on the $i^{th}$ prediction result, to obtain a processed $i^{th}$ prediction result; input the $i^{th}$ prediction result into an $(i+1)^{th}$ prediction stage of the cascade prediction fuse network, to obtain an $(i+1)^{th}$ initial prediction result; add elements of the processed $i^{th}$ prediction result and the $(i+1)^{th}$ initial prediction result together to obtain an $(i+1)^{th}$ prediction result; and repeat the foregoing process, and determine an $n^{th}$ prediction result as the initial prediction map of the human key-point until i+1 is equal to n.

In an embodiment, the basic neural network module 920 is configured to perform convolution processing on the $i^{th}$ prediction result by using a 1×1 convolution kernel, to obtain a convolution result; perform batch normalization on the convolution result to obtain a normalized result; and perform nonlinear processing on the normalized result, to obtain the processed $i^{th}$ prediction result.

In an embodiment, the apparatus further includes: a training module 960, configured to obtain a training set, each sample image in the training set corresponding to a calibration result; input the sample image into the basic neural network module 920 and the pose graph neural network module 940 to obtain a prediction result; and calculate a Euclidean distance between the prediction result and the calibration result, and train parameters in the basic neural network module 920 and the pose graph neural network module 940 according to the Euclidean distance.

In an embodiment, the basic neural network module and the pose graph neural network module are obtained through training in the following manner: obtaining a training set, each sample image in the training set corresponding to a calibration result; inputting the sample image into the basic neural network module and the pose graph neural network module to obtain a prediction result; and calculating a Euclidean distance between the prediction result and the calibration result, and training parameters in the basic neural network module and the pose graph neural network module according to the Euclidean distance.

When the human pose prediction apparatus provided in the foregoing embodiment predict a human pose, the division of the foregoing functional modules is merely used as an example for description. During actual application, the foregoing functions may be allocated to and completed by different functional modules according to requirements, that is, the internal structure of the apparatus is divided into different functional modules, to complete all or some of the foregoing described functions. In addition, the human pose prediction apparatus provided in the foregoing embodiment belongs to the same conception as the method embodiment of the human pose prediction method. For details of a specific implementation process, refer to the method embodiment. Details are not described herein again.

Figure 10:
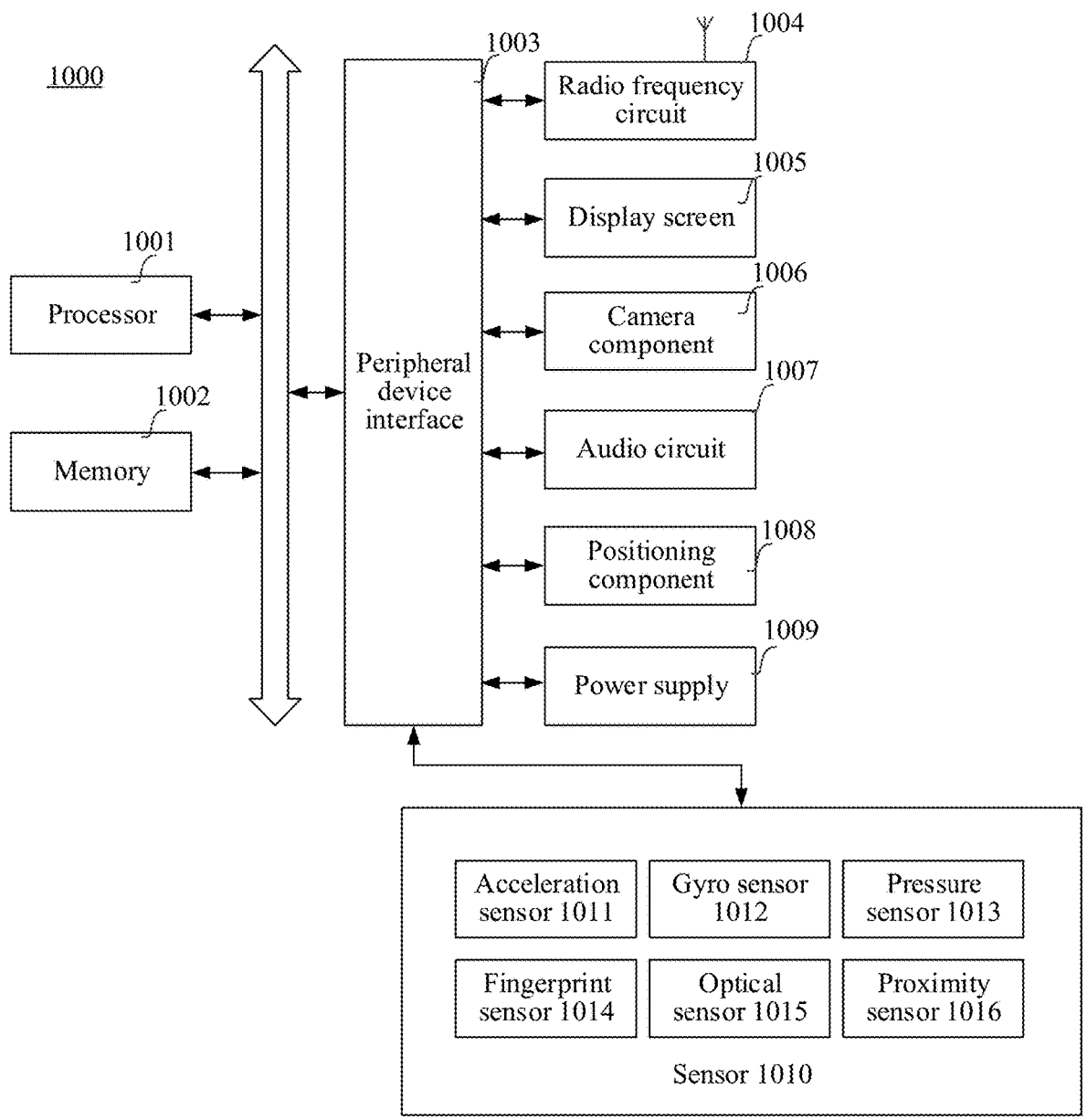
FIG. 10 illustrates a block diagram of an electronic device according to an exemplary embodiment of the present disclosure.

FIG. 10 is a structural block diagram of an electronic device 1000 according to an exemplary embodiment of the present disclosure. The electronic device 1000 may be a smartphone, a tablet computer, a Moving Picture Experts Group Audio Layer III (MP3) player, a Moving Picture Experts Group Audio Layer IV (MP4) player, a laptop computer, or a desktop computer. The electronic device 1000 may alternatively have another name such as a user equipment, a portable electronic device, a laptop electronic device, or a desktop electronic device.

Generally, the electronic device 1000 includes a processor 1001 and a memory 1002.

The processor 1001 may include one or more processing cores, for example, a 4-core processor or an 8-core processor. The processor 1001 may be implemented by using at least one hardware form of digital signal processing (DSP), a field-programmable gate array (FPGA), and a programmable logic array (PLA). The processor 1001 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1001 may be integrated with a graphics processing unit (GPU). The GPU is configured to be responsible for rendering and drawing content that a display screen needs to display. In some embodiments, the processor 1001 may further include an artificial intelligence (AI) processor. The AI processor is configured to process a computing operation related to machine learning.

The memory 1002 may include one or more computer-readable storage media. The computer-readable storage medium may be non-transient. The memory 1002 may further include a high-speed random access memory and a nonvolatile memory, for example, one or more disk storage devices or flash storage devices. In some embodiments, the non-transitory computer-readable storage medium in the memory 1002 is configured to store at least one instruction, and the at least one instruction is configured to be executed by the processor 1001 to implement the human pose prediction method provided in the method embodiments of the present disclosure.

In some embodiments, electronic device 1000 may further include: a peripheral device interface 1003 and at least one peripheral device. The processor 1001, the memory 1002 and the peripheral device interface 1003 may be connected through a bus or a signal line. Each peripheral device may be connected to the peripheral device interface 1003 through the bus, the signal line, or a circuit board. Specifically, the peripheral device includes at least one of a radio frequency circuit 1004, a touch display screen 1005, a camera 1006, an audio circuit 1007, a positioning component 1008, and a power supply 1009.

The peripheral device interface 1003 may be configured to connect at least one input/output (I/O)-related peripheral device to the processor 1001 and the memory 1002. In some embodiments, the processor 1001, the memory 1002 and the peripheral device interface 1003 are integrated on a same chip or circuit board. In some other embodiments, any one or two of the processor 1001, the memory 1002, and the peripheral device interface 1003 may be implemented on a single chip or circuit board. This is not limited in one embodiment.

The radio frequency circuit 1004 is configured to receive and transmit a radio frequency (RF) signal, which is also referred to as an electromagnetic signal. The RF circuit 1004 communicates with a communications network and other communications devices by using the electromagnetic signal. The RF circuit 1004 converts an electrical signal into an electromagnetic signal for transmission, or converts a received electromagnetic signal into an electrical signal. Optionally, the RF circuit 1004 includes: an antenna system, an RF transceiver, one or more amplifiers, a tuner, an oscillator, a digital signal processor, a codec chip set, a subscriber identity module card, and the like. The RF circuit 1004 may communicate with other electronic devices through at least one wireless communication protocol. The wireless communication protocol includes, but is not limited to: a world wide web, a metropolitan area network, mobile communications networks (2G, 3G, 4G, and 5G) of various generations, a wireless local area network and/or a wireless fidelity (WiFi) network. In some embodiments, the RF circuit 1004 may also include a circuit related to near field communication (NFC). This is not limited in the present disclosure.

The display screen 1005 is configured to display a user interface (UI). The UI may include a graphic, a text, an icon, a video, and any combination thereof. When the display screen 1005 is a touch display screen, the display screen 1005 is further capable of collecting touch signals on or above a surface of the display screen 1005. The touch signal may be inputted as a control signal to the processor 1001 for processing. In this case, the display screen 1005 may be further configured to provide a virtual button and/or a virtual keyboard, which is also referred to as a soft button and/or a soft keyboard. In some embodiments, there may be one display screen 1005, disposed on a front panel of the electronic device 1000. In some other embodiments, there may be at least two display screens 1005, disposed on different surfaces of the electronic device 1000 respectively or adopting a folded design. In still other embodiments, the display screen 1005 may be a flexible display screen, disposed on a curved surface or a folded surface of the electronic device 1000. Even, the display screen 1005 may be further set in a non-rectangular irregular pattern, namely, a special-shaped screen. The display screen 1005 may be made of materials such as a liquid crystal display (LCD), an organic light-emitting diode (OLED), or the like.

The camera component 1006 is configured to collect an image or a video. Optionally, the camera component 1006 includes a front-facing camera and a rear-facing camera. Generally, the front-facing camera is disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera component 1006 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1007 may include a microphone and a speaker. The microphone is configured to collect sound waves of a user and an environment, and convert the sound waves into an electrical signal to input to the processor 1001 for processing, or input to the radio frequency circuit 1004 for implementing voice communication. For stereo collection or noise reduction, there may be a plurality of microphones, disposed at different portions of the electronic device 1000 respectively. The microphone may alternatively be an array microphone or an omni-directional collection microphone. The speaker is configured to convert an electrical signal from the processor 1001 or the radio frequency circuit 1004 into sound waves. The speaker may be a conventional film speaker, or may be a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio circuit 1007 may also include an earphone jack.

The positioning component 1008 is configured to position a current geographic location of the electronic device 1000 for implementing navigation or a location based service (LBS). The positioning component 1008 may be a positioning component based on the global positioning system (GPS) of the United States, the BeiDou System of China, and the GALILEO System of Russia.

The power supply 1009 is configured to supply power for various components in the electronic device 1000. The power supply 1009 may be an alternating current, a direct current, a disposable battery, or a rechargeable battery. When the power supply 1009 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charge technology.

In some embodiments, the electronic device 1000 may also include one or more sensors 1010. The one or more sensors 1010 include, but are not limited to: an acceleration sensor 1011, a gyro sensor 1012, a pressure sensor 1013, a fingerprint sensor 1014, an optical sensor 1015, and a proximity sensor 1016.

The acceleration sensor 1011 may detect the magnitude of acceleration on three coordinate axes of a coordinate system established by the electronic device 1000. For example, the acceleration sensor 1011 may be configured to detect components of gravity acceleration on the three coordinate axes. The processor 1001 may control, according to a gravity acceleration signal collected by the acceleration sensor 1011, the touch display screen 1005 to display the user interface in a transverse view or a longitudinal view. The acceleration sensor 1011 may be further configured to collect game or user motion data.

The gyro sensor 1012 may detect a body direction and a rotation angle of the electronic device 1000. The gyro sensor 1012 may cooperate with the acceleration sensor 1011 to collect a 3D action performed by the user on the electronic device 1000. The processor 1001 may implement the following functions according to the data collected by the gyro sensor 1012: motion sensing (for example, changing the UI according to a tilt operation of the user), image stabilization during shooting, game control, and inertial navigation.

The pressure sensor 1013 may be disposed at a side frame of the electronic device 1000 and/or a lower layer of the touch display screen 1005. When disposed on the side frame of the electronic device 1000, the pressure sensor 1013 may detect a holding signal of the user to the electronic device 1000, and left/right hand recognition or a quick action may be performed by the processor 1001 according to the holding signal collected by the pressure sensor 1013. When the pressure sensor 1013 is disposed at the lower layer of the touch display screen 1005, the processor 1001 controls an operable control on the UI interface according to a pressure operation performed by the user on the touch display screen 1005. The operable control includes at least one of a button control, a scroll-bar control, an icon control and a menu control.

The fingerprint sensor 1014 is configured to collect a user's fingerprint, and the processor 1001 identifies a user's identity according to the fingerprint collected by the fingerprint sensor 1014, or the fingerprint sensor 1014 identifies a user's identity according to the collected fingerprint. When identifying that the user's identity is a trusted identity, the processor 1001 authorizes the user to perform related sensitive operations. The sensitive operations include: unlocking a screen, viewing encrypted information, downloading software, paying, changing a setting, and the like. The fingerprint sensor 1014 may be disposed on a front surface, a rear surface, or a side surface of the electronic device 1000. When a physical button or a vendor logo is disposed on the electronic device 1000, the fingerprint sensor 1014 may be integrated with the physical button or the vendor logo.

The optical sensor 1015 is configured to collect ambient light intensity. In an embodiment, the processor 1001 may control the display brightness of the touch display screen 1005 according to the ambient light intensity collected by the optical sensor 1015. Specifically, when the ambient light intensity is relatively high, the display brightness of the touch display screen 1005 is increased. When the ambient light intensity is relatively low, the display brightness of the touch display screen 1005 is decreased. In another embodiment, the processor 1001 may further dynamically adjust a camera parameter of the camera component 1006 according to the ambient light intensity collected by the optical sensor 1015.

The proximity sensor 1016, also referred to as a distance sensor, is generally disposed on the front panel of the electronic device 1000. The proximity sensor 1016 is configured to collect a distance between the user and the front surface of the electronic device 1000. In an embodiment, when the proximity sensor 1016 detects that the distance between the user and the front surface of the electronic device 1000 becomes smaller, the touch display screen 1005 is controlled by the processor 1001 to switch from a screen-on state to a screen-off state. When the proximity sensor 1016 detects that the distance between the user and the front surface of the electronic device 1000 becomes larger, the touch display screen 1005 is controlled by the processor 1001 to switch from the screen-off state to the screen-on state.

A person skilled in the art may understand that the structure shown in FIG. 10 does not constitute a limitation to the electronic device 1000, and the electronic device may include more components or fewer components than those shown in the figure, or some components may be combined, or a different component deployment may be used.

According to another aspect of the present disclosure, a computer-readable storage medium is provided, the storage medium storing at least one instruction, at least one program, and a code set or an instruction set, and the at least one instruction, the at least one program, and the code set or the instruction set being loaded and executed by the processor to implement the voice recognition method according to the first aspect.

One embodiment further provides a computer program product. When run on an electronic device, the computer program product causes the electronic device to perform the human pose prediction method according to the foregoing method embodiments.

A person of ordinary skill in the art may understand that all or some of the steps of the embodiments may be implemented by hardware or a program instructing relevant hardware. The program may be stored in a computer readable storage medium. The storage medium may be a read-only memory, a magnetic disk, or an optical disc.

By using the above disclosed methods and systems, a basic neural network is invoked to process a target image to obtain an initial prediction map of a human key-point (such as a human joint), a human structure diagram is initialized by using the initial prediction map of the human key-point, and iterative prediction is performed on an initialized human structure diagram by using a pose graph neural network, to obtain a final prediction map. Spatial information between human key-points can be mined by fully utilizing the pose graph neural network, thereby obtaining accurate human pose information by combining extraction of image features with mining of spatial information between human key-points. Such approach may provide a substantially improved performance in terms of two standard open datasets (MPII Human Pose Dataset, and Leeds Sports Pose Dataset MPII and LSP) related to human pose estimation.

The foregoing descriptions are merely preferred embodiments of the present disclosure, and are not intended to limit the present disclosure. Any modification, equivalent replacement, improvement and the like made within the spirit and principle of the present disclosure shall fall within the protection scope of the present disclosure.

What is claimed is:

1. A human pose prediction method for an electronic device, comprising:
    using a basic neural network based on image-feature-based prediction to perform prediction on an inputted target image, to obtain an initial prediction map of a human key-point;
    inputting the initial prediction map of the human key-point and a human structure diagram into a pose graph neural network based on spatial information mining, wherein a node in the human structure diagram corresponds to a human joint, and an edge connects adjacent human joints, and wherein the pose graph neural network includes a convolution kernel and a gated recurrent unit;
    using the pose graph neural network and the initial prediction map of the human key-point to initialize the human structure diagram, to obtain an initialized human structure diagram; and
    using the pose graph neural network to perform iterative prediction on the initialized human structure diagram, to obtain a final prediction map, the final prediction map indicating a predicted human pose, wherein the final prediction map is obtained by:
        collecting information on an adjacent node of the node in the human structure diagram by using the convolution kernel before an iterative update, to obtain adjacent node information;
        updating a state of the node according to the adjacent node information by using the gated recurrent unit, the gated recurrent unit being used for digging spatial information between adjacent nodes in the human structure diagram; and
        obtaining the final prediction map after the iterative update.

2. The method according to claim 1, wherein the using the pose graph neural network to initialize the human structure diagram comprises:
    initializing the node in the human structure diagram by using the initial prediction map of the human key-point as an input, to obtain the initialized human structure diagram.

3. The method according to claim 1, wherein the basic neural network comprises a cascade prediction fuse network, and the cascade prediction fuse network comprises n prediction stages, n being a positive integer; the using a basic neural network to perform prediction on an inputted target image, to obtain an initial prediction map of a human key-point comprises:
    obtaining an $i^{th}$ prediction result of the target image in an $i^{th}$ prediction stage of the cascade prediction fuse network, i being a positive integer with an initial value of 1;
    performing convolution processing on the $i^{th}$ prediction result, to obtain a processed $i^{th}$ prediction result;
    inputting the $i^{th}$ prediction result into an $(i+1)^{th}$ prediction stage of the cascade prediction fuse network, to obtain an $(i+1)^{th}$ initial prediction result;
    adding elements of the processed $i^{th}$ prediction result and the $(i+1)^{th}$ initial prediction result together to obtain an $(i+1)^{th}$ prediction result; and
    determining an $n^{th}$ prediction result as the initial prediction map of the human key-point in response to determining i+1 is equal to n.

4. The method according to claim 3, wherein the performing convolution processing on the $i^{th}$ prediction result, to obtain a processed $i^{th}$ prediction result comprises:
    performing convolution processing on the $i^{th}$ prediction result by using a 1×1 convolution kernel, to obtain a convolution result;
    performing batch normalization on the convolution result to obtain a normalized result; and
    performing nonlinear processing on the normalized result, to obtain the processed $i^{th}$ prediction result.

5. The method according to claim 1, wherein the basic neural network and the pose graph neural network are obtained by:
    obtaining a training set, each sample image in the training set corresponding to a calibration result;
    inputting the sample image into the basic neural network and the pose graph neural network to obtain a prediction result; and
    calculating a Euclidean distance between the prediction result and the calibration result, and training parameters in the basic neural network and the pose graph neural network according to the Euclidean distance.

6. An electronic device, comprising: a memory storing computer program instructions; and a processor coupled to the memory and, when executing the computer program instructions, configured to perform:

using a basic neural network based on image-feature-based prediction to perform prediction on an inputted target image, to obtain an initial prediction map of a human key-point;

inputting the initial prediction map of the human key-point and a human structure diagram into a pose graph neural network based on spatial information mining, wherein a node in the human structure diagram corresponds to a human joint, and an edge connects adjacent human joints, and wherein the pose graph neural network includes a convolution kernel and a gated recurrent unit;

using the pose graph neural network and the initial prediction map of the human key-point to initialize the human structure diagram, to obtain an initialized human structure diagram; and using the pose graph neural network to perform iterative prediction on the initialized human structure diagram, to obtain a final prediction map, the final prediction map indicating a predicted human pose, wherein the final prediction map is obtained by:
  collecting information on an adjacent node of the node in the human structure diagram by using the convolution kernel before an iterative update, to obtain adjacent node information;
  updating a state of the node according to the adjacent node information by using the gated recurrent unit, the gated recurrent unit being used for digging spatial information between adjacent nodes in the human structure diagram; and
  obtaining the final prediction map after the iterative update.

7. The electronic device according to claim 6, wherein the using the pose graph neural network to initialize the human structure diagram comprises:
  initializing the node in the human structure diagram by using the initial prediction map of the human key-point as an input, to obtain the initialized human structure diagram.

8. The electronic device according to claim 6, wherein the basic neural network comprises a cascade prediction fuse network, and the cascade prediction fuse network comprises n prediction stages, n being a positive integer; the using a basic neural network to perform prediction on an inputted target image, to obtain an initial prediction map of a human key-point comprises:
  obtaining an $i^{th}$ prediction result of the target image in an $i^{th}$ prediction stage of the cascade prediction fuse network, i being a positive integer with an initial value of 1;
  performing convolution processing on the $i^{th}$ prediction result, to obtain a processed $i^{th}$ prediction result;
  inputting the $i^{th}$ prediction result into an $(i+1)^{th}$ prediction stage of the cascade prediction fuse network, to obtain an $(i+1)^{th}$ initial prediction result;
  adding elements of the processed $i^{th}$ prediction result and the $(i+1)^{th}$ initial prediction result together to obtain an $(i+1)^{th}$ prediction result; and
  determining an $n^{th}$ prediction result as the initial prediction map of the human key-point in response to determining i+1 is equal to n.

9. The electronic device according to claim 8, wherein the performing convolution processing on the $i^{th}$ prediction result, to obtain a processed $i^{th}$ prediction result comprises:
  performing convolution processing on the $i^{th}$ prediction result by using a 1×1 convolution kernel, to obtain a convolution result;
  performing batch normalization on the convolution result to obtain a normalized result; and
  performing nonlinear processing on the normalized result, to obtain the processed $i^{th}$ prediction result.

10. The electronic device according to claim 6, wherein the basic neural network and the pose graph neural network are obtained by:
  obtaining a training set, each sample image in the training set corresponding to a calibration result;
  inputting the sample image into the basic neural network and the pose graph neural network to obtain a prediction result; and
  calculating a Euclidean distance between the prediction result and the calibration result, and training parameters in the basic neural network and the pose graph neural network according to the Euclidean distance.

11. A non-transitory computer-readable storage medium storing computer program instructions executable by at least one processor to perform:
  using a basic neural network based on image-feature-based prediction to perform prediction on an inputted target image, to obtain an initial prediction map of a human key-point;
  inputting the initial prediction map of the human key-point and a human structure diagram into a pose graph neural network based on spatial information mining, wherein a node in the human structure diagram corresponds to a human joint, and an edge connects adjacent human joints, and wherein the pose graph neural network includes a convolution kernel and a gated recurrent unit;
  using the pose graph neural network and the initial prediction map of the human key-point to initialize the human structure diagram, to obtain an initialized human structure diagram; and
  using the pose graph neural network to perform iterative prediction on the initialized human structure diagram, to obtain a final prediction map, the final prediction map indicating a predicted human pose, wherein the final prediction map is obtained by:
    collecting information on an adjacent node of the node in the human structure diagram by using the convolution kernel before an iterative update, to obtain adjacent node information;
    updating a state of the node according to the adjacent node information by using the gated recurrent unit, the gated recurrent unit being used for digging spatial information between adjacent nodes in the human structure diagram; and
    obtaining the final prediction map after the iterative update.

12. The non-transitory computer-readable storage medium according to claim 11, wherein the using the pose graph neural network to initialize the human structure diagram comprises:
  initializing the node in the human structure diagram by using the initial prediction map of the human key-point as an input, to obtain the initialized human structure diagram.

13. The non-transitory computer-readable storage medium according to claim 11, wherein the basic neural network comprises a cascade prediction fuse network, and the cascade prediction fuse network comprises n prediction stages, n being a positive integer; the using a basic neural network to perform prediction on an inputted target image, to obtain an initial prediction map of a human key-point comprises:

obtaining an $i^{th}$ prediction result of the target image in an $i^{th}$ prediction stage of the cascade prediction fuse network, i being a positive integer with an initial value of 1;

performing convolution processing on the $i^{th}$ prediction result, to obtain a processed $i^{th}$ prediction result;

inputting the $i^{th}$ prediction result into an $(i+1)^{th}$ prediction stage of the cascade prediction fuse network, to obtain an $(i+1)^{th}$ initial prediction result;

adding elements of the processed $i^{th}$ prediction result and the $(i+1)^{th}$ initial prediction result together to obtain an $(i+1)^{th}$ prediction result; and determining an $n^{th}$ prediction result as the initial prediction map of the human key-point in response to determining i+1 is equal to n.

14. The non-transitory computer-readable storage medium according to claim 13, wherein the performing convolution processing on the $i^{th}$ prediction result, to obtain a processed $i^{th}$ prediction result comprises:

performing convolution processing on the $i^{th}$ prediction result by using a 1×1 convolution kernel, to obtain a convolution result;

performing batch normalization on the convolution result to obtain a normalized result; and performing nonlinear processing on the normalized result, to obtain the processed $i^{th}$ prediction result.

15. The non-transitory computer-readable storage medium according to claim 11, wherein the basic neural network and the pose graph neural network are obtained by:

obtaining a training set, each sample image in the training set corresponding to a calibration result;

inputting the sample image into the basic neural network and the pose graph neural network to obtain a prediction result; and calculating a Euclidean distance between the prediction result and the calibration result, and training parameters in the basic neural network and the pose graph neural network according to the Euclidean distance.

* * * * *